(12) United States Patent
Bauerle et al.

(10) Patent No.: US 7,122,993 B2
(45) Date of Patent: Oct. 17, 2006

(54) REGULATED VOLTAGE CONTROL OVERRIDE

(75) Inventors: Paul A. Bauerle, Fenton, MI (US); Kerfegar K. Katrak, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 102 days.

(21) Appl. No.: 10/939,549

(22) Filed: Sep. 13, 2004

(65) Prior Publication Data
US 2006/0055378 A1    Mar. 16, 2006

(51) Int. Cl.
*H02P 11/00* (2006.01)

(52) U.S. Cl. .......................... 322/28; 322/90; 322/22; 322/23; 322/24; 322/46; 320/150; 320/64; 320/61

(58) Field of Classification Search .................. 322/28, 322/90, 22, 23, 24, 46; 320/150, 64, 61
See application file for complete search history.

(56) References Cited

U.S. PATENT DOCUMENTS

| | | | | |
|---|---|---|---|---|
| 5,521,486 A | * | 5/1996 | Takamoto et al. | 322/99 |
| 6,346,797 B1 | * | 2/2002 | Perreault et al. | 322/29 |
| 6,373,230 B1 | * | 4/2002 | Jabaji | 322/28 |
| 6,417,650 B1 | * | 7/2002 | Stefanovic et al. | 322/47 |
| 6,552,440 B1 | * | 4/2003 | Gilbreth et al. | 290/52 |
| 6,586,914 B1 | * | 7/2003 | Garrigan et al. | 322/28 |
| 2003/0042872 A1 | * | 3/2003 | Larson | 320/152 |
| 2004/0239295 A1 | * | 12/2004 | Sumimoto et al. | 322/34 |
| 2006/0006845 A1 | * | 1/2006 | Aoyama | 322/22 |

\* cited by examiner

*Primary Examiner*—Darren Schuberg
*Assistant Examiner*—Iraj Mohandesi
(74) *Attorney, Agent, or Firm*—Laura C. Hargitt

(57) ABSTRACT

Apparatus and methods are provided for controlling a voltage output of an alternator having a regulated voltage control (RVC). The apparatus includes a processor configured to transmit one of at least two control signals and a switch coupled to the processor and configured to select one of the control signals. One of the control signals is an RVC enable signal, and another control signal is a voltage boost signal. The method includes determining whether RVC requires override, selecting an output voltage mode of the alternator, activating a boosted voltage mode of the alternator by disabling RVC when RVC requires override, and activating an RVC mode by enabling RVC when the RVC does not require override or upon an occurrence of a lapse of a pre-determined amount of time.

17 Claims, 2 Drawing Sheets

REGULATED VOLTAGE CONTROL OVERRIDE

TECHNICAL FIELD

The present invention generally relates to control systems of vehicle batteries, and more particularly relates to override and reactivation of regulated voltage control systems.

BACKGROUND

Vehicle batteries provide power for a vehicle's starting, lighting, and ignition functions. In general, an automotive battery outputs a few hundred amperes of current for a few seconds of the starting period. The battery is then recharged by the charging system of the vehicle which generally consists of an alternator, rectifier, regulator, and voltage and current controllers. Alternators are used in conventional motor vehicles to convert mechanical energy produced by an internal combustion engine to electrical energy. The alternator is typically coupled to the engine by a rotating shaft to generate alternating current (AC). This current is then converted to direct current (DC), which in turn is used to power electrical circuits in the vehicle during normal driving conditions and to charge a vehicle battery.

During operation of the electrical circuits in the vehicle and charging of the battery, the charge or current provided by the alternator is usually regulated. This regulation may affect the charging efficiency of the vehicle battery as well as other vehicle maintenance requirements. Conventional regulating devices have been developed to maintain the DC alternator output voltage, commonly referred to as a voltage setpoint, within a nominal operating range. Some of these voltage regulating devices tend to be inefficient in fuel consumption when operated in conjunction with batteries of a vehicle.

Regulation strategies implemented in some conventional regulating devices have generally not been tunable or adaptable to changing load demands of the vehicle. During operation of these regulating devices, an appreciable amount of mechanical energy is typically converted to excess electrical energy, and some energy is lost that may have been used to drive or power other vehicle systems or components. The expended mechanical energy usually takes the form of engine torque, which may result in a greater expenditure of fuel to supply higher electrical loads on the vehicle. In addition, mechanical energy may be lost in the form of heat from charging the vehicle battery at relatively higher voltage levels. Increased heat losses tend to decrease efficiency and increase fuel consumption. Damage to the battery may also occur under such conditions due to battery gassing.

One approach to improving the charging efficiency of the vehicle battery has been to use regulated voltage control (RVC). RVC monitors voltage and current draw from the vehicle battery and controls the voltage output of the alternator based on such voltage and current draws. The alternator output may be regulated so as to minimize vehicle fuel consumption. For example, by taking into account a battery state of charge and the electrical energy drawn by the vehicle at a given time, an alternator setpoint voltage may be optimized so as to more closely track the electrical load requirements of the vehicle and minimize the amount of excess electrical energy generated. By optimizing the setpoint, based at least in part on the amount of stored electrical energy and estimated vehicle load, mechanical energy otherwise used to produce excess electrical energy is typically conserved and used for other purposes to generally provide a fuel economy gain when operating the vehicle. General advantages derived from RVC include improved fuel economy, increased battery life, and increased lamp and switch life.

Vehicle batteries may be used as a power source for externally coupled accessories. For example, a vehicle may tow a trailer, a boat, or other common vehicle accessory for recreation that has a separate auxiliary battery requiring charging. In another example, a road-side assistance truck may assist a stranded vehicle with a drained battery by coupling the truck battery with the drained battery of the vehicle for a "jump start". Using RVC generally lowers regulated voltage to improve fuel economy but reduces the amount of charging current usually available for charging. Because RVC generally lowers available voltage shortly after starting and idling of a vehicle engine, the drained battery or auxiliary battery may not fully charge in vehicles using RVC.

Accordingly, it is desirable to provide an override for regulated voltage control systems of vehicle battery and alternator operation. In addition, it is desirable to provide an operator-activated override of regulated voltage control systems having a variety of selectable modes of operation. Furthermore, other desirable features and characteristics of the present invention will become apparent from the subsequent detailed description of the invention and the appended claims, taken in conjunction with the accompanying drawings and this background of the invention.

BRIEF SUMMARY

According to various exemplary embodiments, an apparatus is provided for controlling a voltage output of a vehicle alternator having a regulated voltage control (RVC). In one exemplary embodiment, the apparatus includes a processor configured to transmit one of at least two control signals and a switch coupled to the processor and configured to select one of the control signals. One of the control signals is an RVC enable signal, and another control signal is a voltage boost signal.

In another exemplary embodiment, the apparatus is a voltage regulation system for a vehicle having a battery and an alternator. The system includes a processor having at least two states, a first control module coupled to said processor, and a switch coupled to the processor for selecting one of the states of the processor. A first state of the processor corresponds to an RVC enable, and a second state of the processor corresponds to a voltage boost. The first control module is configured to output a first signal to the alternator based on one of the states of the processor, and the first signal is selected from one of at least an RVC enable signal and a voltage boost signal.

In another exemplary embodiment, a method is provided for boosting the voltage output of an alternator having RVC. The method includes: determining whether RVC of the alternator requires override; selecting an output voltage mode of the alternator from one of an RVC mode, a disable RVC mode, a tow/haul boosted voltage mode, and a tow/haul non-boosted voltage mode; activating a boosted voltage mode of the alternator by disabling RVC when RVC requires override; and activating an RVC mode by enabling RVC when the RVC does not require override or upon a lapse of a pre-determined amount of time.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

An electrical power system in a motor vehicle may generally include an engine, an engine or powertrain controller, an alternator/voltage regulator, a battery, an electrical distribution system (e.g., wiring), and a plurality of vehicle electrical components. The alternator produces an alternating current (AC) which in turn is converted to a direct current (DC) via a rectifier circuit to generally provide power to operate the vehicle electrical components and charge the battery. The battery typically provides electrical power when the vehicle engine is not running and also when an electrical load is not fully satisfied by the alternator alone. Such a situation may arise, for example, when the engine is idling and several electrical components are operating simultaneously.

Alternator power output is usually a function of alternator revolutions per minute (RPM) and a field current generated by the alternator. An increase in either may cause an increase in power output within the physical limits of the alternator. Voltage regulation is typically accomplished by controlling the field current at a pre-determined RPM. The voltage regulator generally controls current through field windings of the alternator to maintain a calibrated system voltage setpoint.

Figure 1:
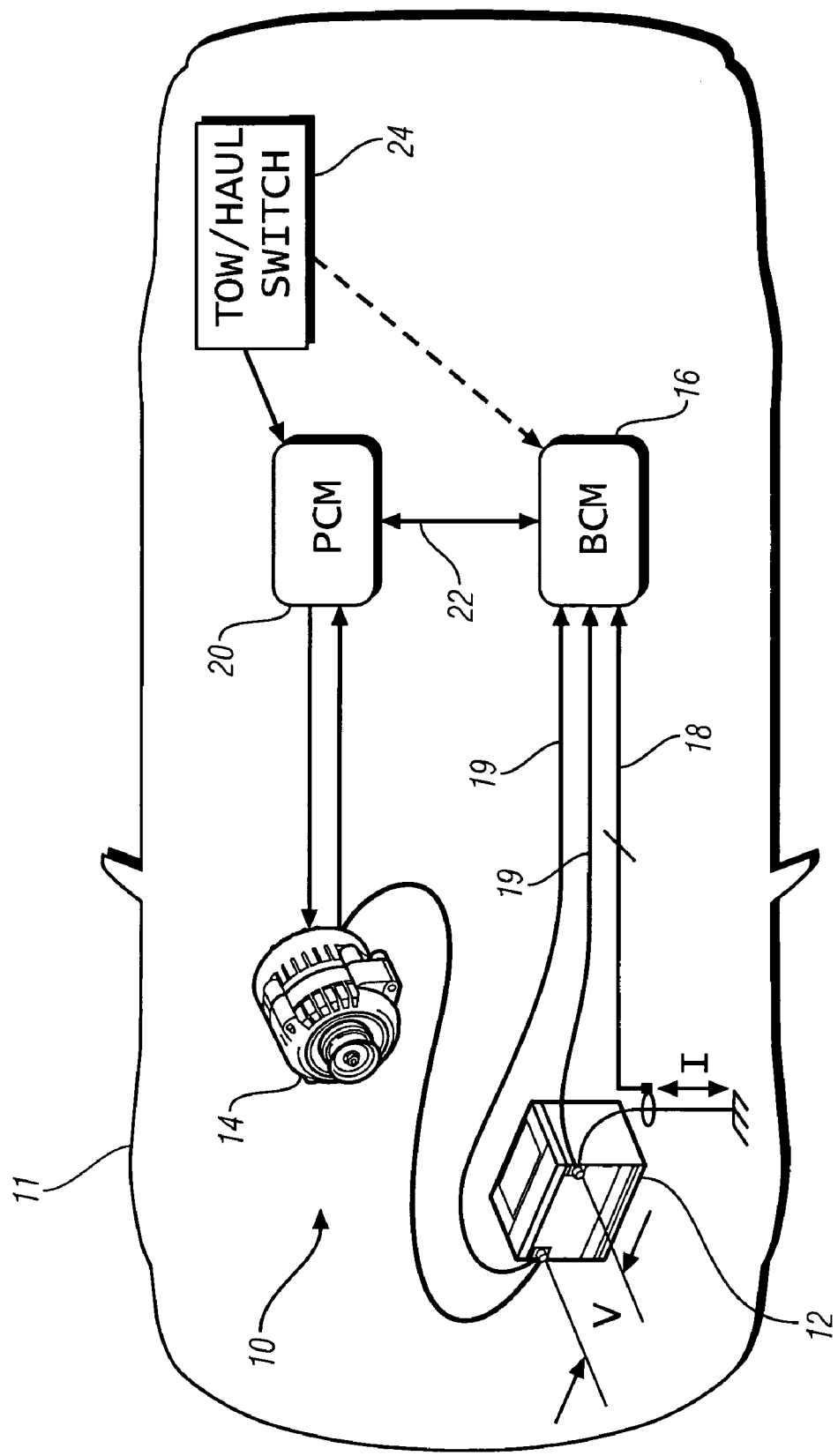
FIG. 1 is a schematic diagram of an exemplary embodiment of a regulated voltage control system.

Referring to the drawings, FIG. 1 is a schematic diagram of an exemplary embodiment of a regulated voltage control system, shown generally at 10. The system 10 includes a main rechargeable electric battery 12 and an alternator 14 that provide voltage and current output to a motor vehicle 11, control modules 16, 20 that are connected to the battery 12 and alternator 14, and an RVC override switch 24 that is connected to one of the control modules 16, 20. As used herein, the term "switch" may include any associated processing unit that determines a desired switch selection or mode and transmits a signal corresponding to the desired switch selection. The battery 12 and alternator 14 may provide voltage and current to the aforementioned vehicle electrical components via the electrical distribution system (not shown). The control modules 16, 20 vary a voltage setpoint of the alternator 14 and provide regulated voltage control (RVC).

Although not shown, any number of conventional vehicle components may be connected to the battery 12 and/or alternator 14 to create an electrical load or draw voltage or current from the battery 12 and/or alternator 14. It should be appreciated that the blocks of FIG. 1 (as well as the blocks in the other block diagrams disclosed herein) can represent functional elements and discrete hardware elements. For example, in one embodiment of the invention, some of the functions or hardware elements illustrated in FIG. 1 may be implemented in a single processor unit. Alternatively, a portion of the functions may be implemented in a single processor unit in combination with hardware elements. The functions can be implemented in hardware, all in software, or a combination of hardware and software can be used.

A regulator circuit may further be provided to control the alternator voltage output or a "setpoint" voltage so as to prevent battery overcharging and damage to other vehicle electrical components. The regulator circuit may be part of the alternator or a separate vehicle component that is connected with the alternator. The alternator setpoint voltage is generally selected to coincide with the charging and output characteristics of the vehicle battery. For lead-acid batteries, for example, the charging profile is usually a linear function of the battery temperature. The maximum alternator setpoint voltage is generally selected to be within the operational limits of one or more of the vehicle electrical components, while the minimum setpoint voltage is generally selected to coincide with the discharge voltage of the battery. In between, in order to accommodate the chemical processes of the battery and to prevent "gassing", the alternator setpoint voltage may be regulated as a function of the battery temperature, such as actually measured or otherwise derived.

The battery 12 may be a conventional vehicle battery such as a 12-Volt battery having a positive battery post, or terminal, that is connected to the alternator 14 and negative battery post that is connected to ground. The alternator 14 may also be a conventional vehicle alternator that is configured to have the regulator circuit incorporated therewith, as previously discussed hereinabove, or configured to have the regulator circuit externally connected therewith as a stand-alone component or incorporated with another vehicle component, such as a control module.

In one embodiment, a body control module (BCM) 16 is connected to the battery 12 by voltage sense lines 19 and current sense lines 18 to track battery SOC, and a powertrain control module (PCM) 20 communicates with the BCM 16 via a serial data bus 22 regarding voltage or current drawn from the battery 12. The PCM 20 in turn detects voltage and/or current output from the alternator 14 and transmits control signals to the alternator 14 to vary such voltage output. For example, the PCM may modify the alternator setpoint voltage, such as via the regulator circuit, depending on the amount of voltage or current drawn from the battery 12. Although the regulated voltage control system 10 is described in the context of the BCM communicating data regarding the battery 12 to the PCM 20, a variety of other control modules may also be used to communicate battery 12 data to the PCM 20. Additionally, battery data may be directly communicated to the PCM 20.

A battery state-of-charge (SOC) monitor 17 and a load status indicator (not shown) may be used in communication with the BCM 16, PCM 20, or other control module of the motor vehicle 11. The battery SOC monitor, which can be any suitable circuit or means known in the art for measuring battery SOC, provides an indication of battery SOC to the control module. The battery SOC monitor can be physically part of the control module or a stand-alone monitor having hardware and/or software components separate and apart from the control module. In one embodiment, the battery SOC monitor includes the current sense lines 18 and voltage sense lines 19. The load status indicator can be any suitable means for indicating vehicle load status information to the control module.

The control modules 16, 20, which can be any suitable powertrain controller or separate microprocessor-based module, include a central processing unit (CPU), corresponding input/output ports, read-only memory (ROM), or equivalent electronic storage medium containing processor-executable instructions and database values, random-access memory (RAM), and a data bus of any suitable configuration. The PCM 20 may receive a variety of other signals from various sensors coupled to the engine and/or the vehicle, including but not limited to signals indicating engine coolant temperature, cylinder head temperature, and ambient air temperature. The PCM 20 monitors the operation of the alternator 14 and generates an alternator setpoint control signal.

The control modules 16, 20 may further include computer program code for estimating actual and/or scheduled vehicle electrical load. The control module 16, 20 may use this load status information provided, such as provided by the aforementioned load indicator, a mapping of vehicle functions and vehicle loads, and a summing means to derive the vehicle electrical load. In one embodiment, the control module 16, 20 includes computer program code for deriving a battery temperature based on sensed engine coolant temperature, ambient air temperature, and cylinder head temperature. This battery temperature may in turn be used to derive the maximum alternator setpoint voltage. In another embodiment, a temperature sensor is provided for measuring an actual battery temperature. Regardless of the method used to establish battery temperature, multiple setpoint voltage/battery temperature data curves may be stored in look-up tables and used by the control modules 16, 20.

In one embodiment during normal RVC operation, the BCM 16 and or the PCM 20 transmit RVC mode signals to the alternator 14 that activate RVC mode to decrease the voltage output of the alternator 14 shortly after engine start-up and idle. During RVC operation, the alternator setpoint voltage is lowered based on the battery SOC and battery temperature. Activation of the override switch 24 interrupts RVC mode and a voltage boost is provided from the alternator 14. The override switch 24 includes a processor and selector and may be a separate stand-alone switch having a coupling terminal to connect to the PCM 20, or other control module in the vehicle, or may be a reconfigured pre-existing switch, such as a tow/haul switch, in the motor vehicle 11. Activation of the tow/haul switch enables a powertrain operation mode of the motor vehicle 11 that accounts for towing and hauling conditions, such as increased load demand on the engine. For example, turning-on the tow/haul switch may increase a pre-set torque output of the engine.

In one embodiment, the override switch 24 may be configured to cycle through three states with a momentary press and hold for each state. In another embodiment, the switch 24 may have three separate positions. Each of the three states and three positions correspond to a normal RVC mode, a tow/haul with boost mode, and a tow/haul without boost mode. The normal RVC mode enables or re-enables RVC of the alternator 14, the tow/haul with boost mode activates tow/haul powertrain operation and disables RVC with voltage boost from the alternator 14, and the tow/haul without boost mode activates tow/haul powertrain operation and enables RVC without voltage boost from the alternator 14.

In another embodiment, the switch 24 may be configured to have four separate positions or states. Each of the four states correspond to the previously mentioned normal RVC mode, tow/haul with boost mode, and tow/haul without boost mode, and further includes a disable RVC with boost mode. In this embodiment, the RVC is disabled and a voltage boost is provided from the alternator 14 that is greater than the regulated voltage output provided under disabled RVC mode. The voltage boost provided by the alternator 14 under the tow/haul with boost mode in the three-mode configuration, as previously discussed hereinabove, may be varied among the voltage output provided under disabled RVC mode, the voltage output provided under the previously mentioned disabled RVC with boost mode, or any other level of voltage output that is greater than the output during enabled RVC mode.

Additionally, the override switch 24 may be configured for a variety of logic inputs to the PCM 20 or other control module. For example, the switch 24 may be a single three-state switch, as previously mentioned, having one output to the PCM 20. In another example, the switch 24 may be two discrete outputs that are received by the PCM 20, each output having an ON state and an OFF state, or a Hi state and a Low state. The particular configuration of the switch 24 is not critical if at least a normal RVC mode and boost mode are provided by activation of the switch 24. In one embodiment, the switch processor transmits one of at least two control signals to the terminal, and the selector selects one of the control signals. One of the control signals is an RVC enable signal, and a second signal is a boost signal.

The override switch 24 may be located on the vehicle for activation by a passenger or may be integrated with a conventional tow/haul wiring harness. For example, the override switch 24 may be integrated with a tow/haul wiring harness, such as generally used to couple with a power source for a towed or hauled accessory, for activation upon connection of the tow/haul wiring harness with the towed or hauled accessory. Examples of towed or hauled accessories include, by way of example and not of limitation, boats, trailers, other recreational type vehicles, and portable appliances.

In one example, an auxiliary battery may be connected to the main battery 12, such as in a "jump-start" scenario where the auxiliary battery requires charging from the main battery 12. In another example, in towing and hauling conditions, the auxiliary battery of the towed or hauled accessory may be connected to the main battery 12, such as through the tow/haul wiring harness, and require charging from the main battery 12. Normal RVC mode generally decreases the voltage and/or current output of the alternator 14. Additionally, wiring resistance and a lower potential difference between the main battery and the auxiliary battery may contribute to decreasing charging current from the main battery. Disabling RVC by activation of the override switch 24 creates a voltage boost from the alternator 14 that generally assists in charging the connected auxiliary battery.

In a stand-alone switch embodiment, activation of the override switch 24 disables RVC mode such that the alternator setpoint voltage returns to non-RVC operating levels, which are typically higher than RVC levels. The override switch 24 may be configured to have a variety of modes depending on the implementation of the switch 24. For example, the override switch 24 may have a normal RVC mode that enables or re-enables RVC of the alternator 14 and a boost mode that disables RVC of the alternator 14. In another example, the override switch 24 may be implemented as the tow/haul switch and have a normal RVC mode that enables or re-enables RVC of the alternator 14, a tow/haul with boost mode that disables RVC of the alternator 14 and creates a voltage boost from the alternator 14, and a tow/haul without boost mode that enables RVC of the alternator 14 without creating a voltage boost from the alternator 14. As previously mentioned hereinabove, a disabled RVC with boost mode may additionally be implemented in a four-mode configuration of the override switch 24.

Upon activation of a boost mode or tow/haul with boost mode, status information may optionally be provided to a passenger using a driver information center message. The boost mode or tow/haul with boost mode may be deactivated or disabled based on a vehicle speed, such as exceeding a pre-determined speed threshold, passenger selection, such as by pressing the switch 24, or a time-out feature that disables RVC override upon expiration or lapse of a pre-determined amount of time. Activation of the override switch 24 during connection of an auxiliary battery requiring charging generally assists in preventing or reducing occurrence of the auxiliary battery being discharged or having a low state of charge. Additionally, vehicle owner/customer satisfaction may be improved for customers who frequently tow boats or travel trailers having auxiliary batteries. The invented regulated voltage control system provides customers with control of voltage boost for towing and jump-start scenarios.

Figure 2:
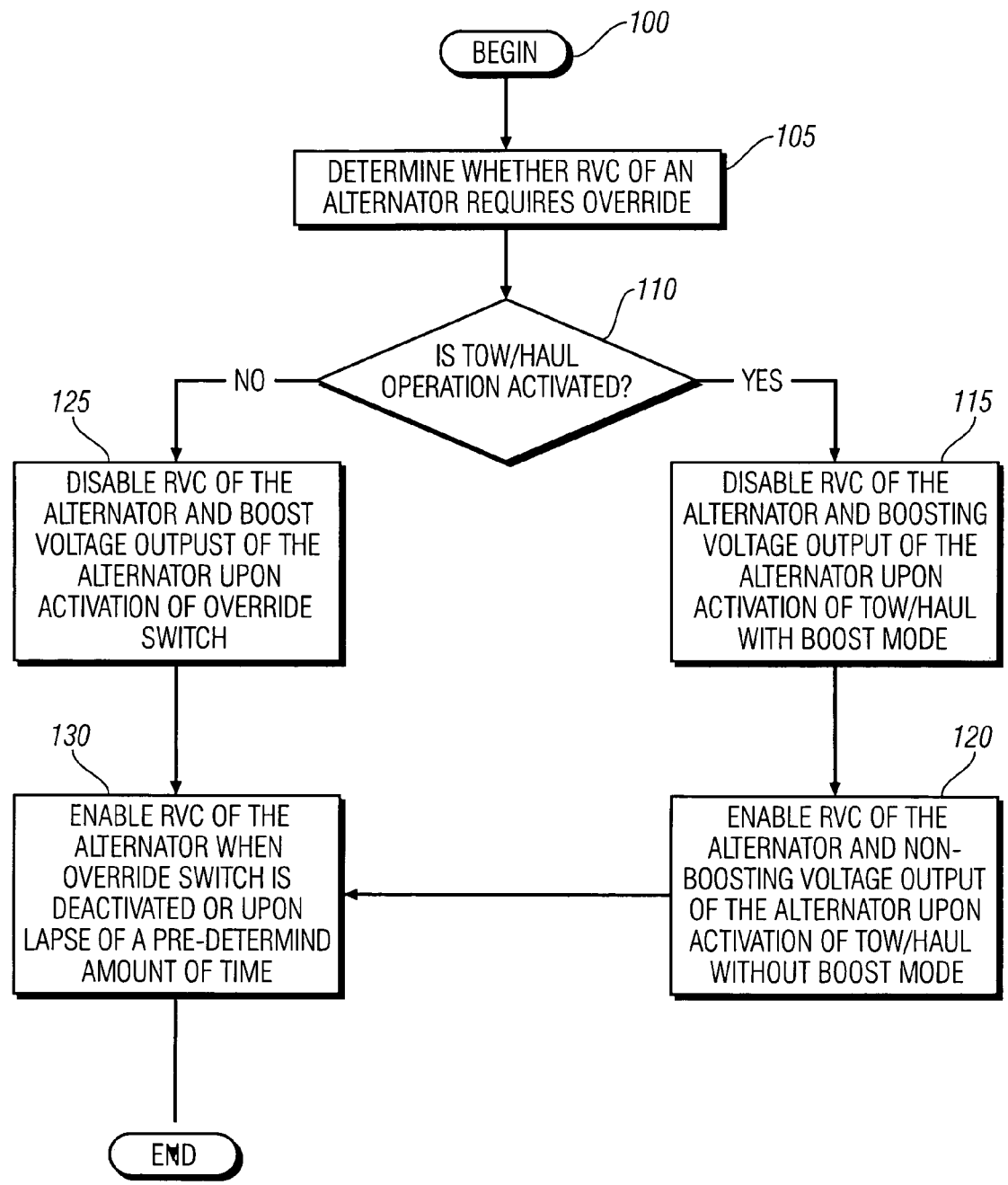
FIG. 2 is a flow diagram of an exemplary embodiment of a method of controlling voltage output from a vehicle alternator.

FIG. 2 is a flow diagram of an exemplary embodiment of a method of controlling voltage output from a vehicle alternator. The method begins at step 100. The control module 16, 20 determines whether RVC of the alternator 14 requires override at step 105. In one embodiment, activation of the override switch 24 alerts the control module 16, 20 that RVC of the alternator 14 requires override. This activation may occur by passenger selection of an RVC mode using the selector of the switch 24. Alternatively, the override switch 24 may be activated upon coupling of the auxiliary battery to the tow/haul wiring harness, for example.

Depending on whether the override switch 24 is implemented with a pre-existing switch, such as the tow/haul switch, RVC is disabled and then re-enabled. The control module 16, 20 determines if the tow/haul operation is activated, such as by a tow/haul switch, at step 110. Different modes of RVC operation are available depending on a particular implementation of the override switch 24.

In one embodiment, when the tow/haul switch is activated by selection of a tow/haul with boost mode, the vehicle powertrain operates in tow/haul mode, RVC is disabled, and boosted voltage is output by the alternator at step 115. In this case, the switch processor transmits an RVC mode signal corresponding to the tow/haul with boost mode to the PCM 20, and the PCM 20 in turn transmits an RVC override signal to the alternator 14. When the tow/haul switch is activated by selection of a tow/haul without boost mode, RVC is enabled without boosted voltage output by the alternator at step 120. In this case, the switch processor transmits an RVC mode signal corresponding to the tow/haul without boost mode to the PCM 20, and the PCM 20 in turn transmits an RVC enable signal to the alternator 15.

In another embodiment using a control module 16 that communicates between the PCM 20 and the override switch 24, an RVC control signal is transmitted by the control module 16 to the PCM 20 based upon the received RVC mode signal. For example, when tow/haul with boost mode is selected, the switch processor transmits an RVC mode signal corresponding to the tow/haul with boost mode to the control module 16, and the control module 16 in turn transmits an RVC control signal corresponding to the tow/haul with boost mode to the PCM 20. When tow/haul without boost mode is selected, the switch processor transmits an RVC mode signal corresponding to the tow/haul without boost mode to the control module 16, and the control module 16 in turn transmits an RVC control signal corresponding to the tow/haul without boost mode to the PCM 20.

In a stand-alone or separate override switch 24 embodiment, RVC of the alternator 14 is disabled and boosted voltage is output from the alternator upon activation of the switch at step 125. In this case, the switch processor transmits an RVC disable mode signal corresponding to RVC override mode to the PCM 20, and the PCM 20 in turn transmits an RVC override signal to the alternator 14. In another embodiment using a control module 16 that communicates between the PCM 20 and the override switch 24, the switch processor transmits an RVC disable mode signal corresponding to RVC override mode to the control module 16, and an RVC disable control signal is transmitted by the control module 16 to the PCM 20.

RVC of the alternator 14 is enabled or re-enabled when the override switch 24 is deactivated or upon lapse of a pre-determined amount of time at step 130. For example, RVC of the alternator 14 may be re-enabled when the override switch 24 is deactivated such as by manual operation of the passenger.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus for placing an alternator having a regulated voltage control (RVC) into a desired operating mode, said apparatus comprising:

a switch having a first position and a second position each corresponding to one of the operating modes of the alternator, said switch configured to activate/deactivate a towing/hauling powertrain mode; and a processor coupled to said switch and configured to transmit a control signal to the alternator based upon said position of said switch, wherein said control signal is selected from an RVC enable signal and a voltage boost signal to thereby place the alternator into the desired operating mode.

2. An apparatus according to claim 1, wherein said control signal is selected from:

an RVC mode signal, said RVC mode signal enabling RVC of the alternator;

a tow/haul with boost mode signal, said tow/haul with boost mode signal disabling RVC of the alternator and boosting voltage output of the alternator; and a tow/haul without boost mode signal, said tow/haul without boost mode signal enabling RVC of the alternator without boosting voltage output of the alternator.

3. An apparatus according to claim 1, wherein said control signal is selected from:

an RVC mode signal enabling RVC of the alternator;

a tow/haul with boost mode signal disabling RVC of the alternator and boosting voltage output of the alternator;

a tow/haul without boost mode signal enabling RVC of the alternator without boosting voltage output of the alternator; and a disable RVC with boost mode signal disabling RVC of the alternator and boosting voltage output of the alternator.

4. An apparatus according to claim 2, wherein said processor comprises an input for receiving an input signal from said switch; and wherein said switch comprises three states corresponding to said RVC mode signal, said tow/haul with boost mode signal, and said tow/haul without boost mode signal.

5. An apparatus according to claim 2, wherein said switch comprises:

a first output coupled to said processor, said first output transmitting one of an ON state and an OFF state; and a second output coupled to said processor, said second output transmitting one of an ON state and an OFF state;

wherein said processor is configured to transmit one of said RVC mode signal, said tow/haul with boost mode signal, and said tow/haul without boost mode signal depending on said first output of said switch and said second output of said switch.

6. A voltage regulation system for a vehicle having a battery and an alternator, said system comprising:

a processor comprising at least two states, a first state corresponding to an RVC enable and a second stare corresponding to a voltage boost;

a powertrain control module coupled to said processor, said powertrain control module configured to output a first signal to the alternator based on one of said at least two states, said first signal selected from at least an RVC enable signal and a voltage boost signal; and a switch coupled to said processor for selecting one of said at least two states.

7. A system according to claim 6 further comprising a second control module coupled with said processor and said PCM, said second control module configured to receive one of said at least two states from said processor and transmit a second signal to said PCM, said PCM selecting said first signal based on said second signal from said second control module.

8. A system according to claim 7, wherein said second control module is selected from a body control module (BCM) and an engine control module (ECM).

9. A system according to claim 6, wherein said switch is a tow/haul switch configured to activate/deactivate a towing/hauling powertrain mode.

10. A system according to claim 9, wherein said at least two states comprises a normal RVC mode enabling RVC of the alternator;

a tow/haul with boost mode activating said towing/hauling powertrain mode and disabling RVC of the alternator and boosting voltage output of the alternator; and a tow/haul without boost mode activating said towing/hauling powertrain mode and enabling RVC of the alternator without boosting voltage output of the alternator.

11. A system according to claim 10, wherein said switch comprises three states corresponding to one said normal RVC mode, said tow/haul with boost mode, and said tow/haul without boost mode.

12. A system according to claim 10, wherein said switch comprises two outputs coupled to said processor, each of said two outputs transmitting one of an ON state and an OFF state; and wherein said processor is configured to transmit one of said normal RVC mode, said tow/haul with boost mode, and said tow/haul without boost mode depending on said state transmitted from each of said two outputs of said switch.

13. A system according to claim 10, wherein said first signal is selected from an enable RVC signal, a tow/haul with boost signal, a tow/haul without boost signal, said enable RVC signal corresponding to said enable RVC mode, said tow/haul with boost signal corresponding to said tow/haul with boost mode, and said tow/haul without boost signal corresponding to said tow/haul without boost mode.

14. A method for boosting voltage output from an alternator having regulated voltage control (RVC), said method comprising the steps of:

activating and deactivating a tow/haul operation mode;

determining whether RVC of the alternator requires override;

activating an override RVC mode of the alternator by disabling RVC when RVC requires override; and activating an RVC mode by enabling RVC when the RVC does not require override or upon a lapse of a predetermined amount of time.

15. A method according to claim 14, wherein said determining step comprises detecting a reduced current output from the main battery.

16. A method according to claim 14, wherein said determining step comprises connecting an auxiliary battery requiring charge to the main battery.

17. A method according to claim 14, wherein said override mode activating step comprises:

disabling RVC and boosting voltage from the alternator upon selection of a tow/haul boosted voltage mode;

disabling RVC with no voltage boost of the alternator upon selection of a tow/haul non-boosted voltage mode.

* * * * *